(12) United States Patent
Krishnan et al.

(10) Patent No.: US 7,383,272 B2
(45) Date of Patent: Jun. 3, 2008

(54) METHOD AND SYSTEM FOR VERSIONED SHARING, CONSOLIDATING AND REPORTING INFORMATION

(75) Inventors: Ganesh Krishnan, Cupertino, CA (US); Sarang Kulkarni, Sunnyvale, CA (US); Dharmesh Kirit Dadbhawala, Mountain View, CA (US)

(73) Assignee: Boardwalktech, Inc., Palo Alto, CA (US)

( * ) Notice: Subject to any disclaimer, the term of this patent is extended or adjusted under 35 U.S.C. 154(b) by 230 days.

(21) Appl. No.: 10/838,111

(22) Filed: May 3, 2004

(65) Prior Publication Data

US 2005/0256912 A1    Nov. 17, 2005

(51) Int. Cl.
*G06F 17/30* (2006.01)
*G06F 12/14* (2006.01)

(52) U.S. Cl. .............................. 707/101; 707/8; 707/9; 707/10; 707/203; 707/204

(58) Field of Classification Search .............. 707/9, 707/10, 101, 203, 204, 103
See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 5,713,024 A | * | 1/1998 | Halladay | 717/168 |
| 5,873,097 A | * | 2/1999 | Harris et al. | 707/203 |
| 6,430,545 B1 | * | 8/2002 | Honarvar et al. | 706/47 |
| 2003/0023868 A1 | * | 1/2003 | Parent | 713/200 |

* cited by examiner

*Primary Examiner*—Luke S Wassum
*Assistant Examiner*—Nirav K Khakhar
(74) *Attorney, Agent, or Firm*—William L. Botjer

(57) ABSTRACT

A method, system and computer program product for managing information is disclosed. The information is stored in a database accessible to a plurality of users. A part of the information is isolated from the database. A user can modify the isolated part of the information. The modified information is compared with the isolated information and a set of changes is extracted from the comparison. The set of changes are appended to the information in the database. Each part of the information in the database has a version associated with it. When changes to a part of the information are appended, the modified part is versioned in an incremental fashion. Prior versions of a part of the information can be accessed and modified by the users.

12 Claims, 14 Drawing Sheets

| | A | B | C | D | E | F | G | H | I |
|---|---|---|---|---|---|---|---|---|---|
| 1 | Expense Report | | | | | | For period ending: | | 9/6/2003 |
| 2 | Expenses | Sun | Mon | Tue | Wed | Thu | Fri | Sat | Total |
| 3 | Date | 0 | 0 | 0 | 0 | 0 | 0 | 0 | 0 |
| 4 | Place | 100 | 100 | 100 | 100 | 100 | 100 | 100 | 700 |
| 5 | Meals | 100 | 100 | 100 | 100 | 100 | 100 | 100 | 700 |
| 6 | Airfare | 100 | 100 | 100 | 100 | 100 | 100 | 100 | 700 |
| 7 | Taxi | 100 | 100 | 100 | 100 | 100 | 100 | 100 | 700 |
| 8 | Tips | 100 | 100 | 100 | 100 | 100 | 100 | 100 | 700 |
| 9 | Supplies | 100 | 100 | 100 | 100 | 100 | 100 | 100 | 700 |
| 10 | Car Rental | 100 | 100 | 100 | 100 | 100 | 100 | 100 | 700 |
| 11 | Parking | 100 | 100 | 100 | 100 | 100 | 100 | 100 | 700 |
| 12 | Tolls | 100 | 100 | 100 | 100 | 100 | 100 | 100 | 700 |
| 13 | Lodging | 100 | 100 | 100 | 100 | 100 | 100 | 100 | 700 |
| 14 | Telephone | 100 | 100 | 100 | 100 | 100 | 100 | 100 | 700 |
| 15 | Misc. | 100 | 100 | 100 | 100 | 100 | 100 | 100 | 700 |
| 16 | Totals | 1200 | 1200 | 1200 | 1200 | 1200 | 1200 | 1200 | 8400 |

FIG. 6

METHOD AND SYSTEM FOR VERSIONED SHARING, CONSOLIDATING AND REPORTING INFORMATION

BACKGROUND

The present invention relates to the field of enterprise information and planning and more particularly to a method, a system and a computer program product for managing information within an enterprise.

Enterprises today are burgeoning in terms of the number of people employed, the number of departments, and geographic locations. Along with the growth of enterprises, there is a corresponding increase in the amount of information generated within the enterprise. The sources of information are varied in terms of their geographic location and the type of information generated. This variety makes management of information a time consuming and costly task.

The task of managing information includes consolidation of data within documents, storing the data, retrieving the stored data for analysis and representing the retrieved data through a user interface. Sales reports, budgets, requests for proposals and feedback are a few examples of information within an enterprise. Sales reports are obtained from different sales offices, various departments within the enterprise provide their budgets or capital requirements, vendors send requests for proposals (RFP) to order products, and feedback is obtained from customers.

The information obtained from the different sources is used in planning activities by the executives of the enterprise. For example, sales reports and RFP are used to plan production volumes within a manufacturing enterprise. Feedback from customers is utilized in planning new products and improving the existing products. Further, the information provided by the sources may be in various forms. Examples of the forms include e-mails, website forms, and data files such as spreadsheets.

Various sources periodically provide information. Therefore, management of information is not a one-time process. Often, the management of information has to be done on demand, i.e., as and when the information is provided. For example, vendors send RFP as and when they require products. Production volumes, which are dependent on these RFP, need to be updated accordingly.

Various problems can arise while managing information due to the variety of sources and the periodic availability of new information. These problems include a lack of data integrity and security, difficulty in consolidation, and the non-availability of historical data. To ensure data integrity, information that depends on new data values has to be updated accordingly. For example, if new RFP are obtained in a manufacturing enterprise, the planned production volumes that depend on these RFP must be updated accordingly. Data from the various sources must be consolidated in a single place. For example, the data is obtained from e-mails and data files. To reduce the time in consolidation, the data must be automatically extracted from e-mails and data files and then stored. Security must be ensured while managing the information. For example, the executives of an enterprise should have access to information regarding all the departments within the enterprise, but a customer should not have access to this information. Further, in order to use the information for planning, historical information must also be available. This is useful, for example, in identifying trends in data values. Historical data may also be useful if a rollback is required, which involves returning data to previous values. This may be important if, for example, it is found that invalid data was received from a source. Hence, the information must be versioned or chronicled so that data of a particular time or state can be accessed later.

A system for managing information in an enterprise is described in U.S. patent application Ser. No. 20030177135, titled "Multi-user Database for Computer-based Information", filed on Apr. 11, 2003 and assigned to Axon Information Technology Pty. Ltd. The system comprises a multi-user database that stores information as a plurality of data elements. Data files are imported and analyzed to extract the data elements. Data files are analyzed and the data elements are extracted. Amendments to the data elements may be made directly, or by exporting parts of the multi-user database as data files, making changes to the exported data files, and then re-importing the amended data files. Information can be used by structuring the information according to the requirement of a user.

Further, U.S. Pat. No. 5,347,653, titled "System for Reconstructing Prior Versions of Indexes Using Records Indicating Changes between Successive Versions of the Indexes", filed on Jun. 28, 1991 and assigned to Digital Equipment Corporation MA describes a method and a system for versioning information objects in a database. The latest versions of information objects are stored in a complete form. Prior versions are saved only as delta changes, which are the changes that take place between the prior versions and the latest version. In this way, prior versions can be recreated from the latest versions.

However, the systems mentioned above do not provide a complete solution for managing information within an enterprise, while addressing all the problems mentioned before. Hence, there exists a need for a method and a system for managing information within an enterprise that allows viewing, comparing and reverting to historical data. The system should allow information to be viewed in a manner, which is useful to the executives of an enterprise. It should also allow the executives to compare current information with previous information and analyze trends. Further, the system should also allow reversion to a previous state. Finally, it should also address the problems arising due to lack of data integrity and security, and difficulty in consolidation.

SUMMARY

The present invention is directed to a method, system and a computer program product for managing information.

An aspect of the invention is to provide a method of managing information that allows viewing, comparing and reverting to historical data.

Another aspect of the invention is to enable a plurality of users to access information concurrently.

Yet another aspect of the invention is to provide a system for managing information that addresses the problems related to lack of data integrity, difficulty in consolidation, and lack of security of information.

A further aspect of the invention is to enable executives in an enterprise to use the information for decision management.

In accordance with one aspect of the invention, the users access information from a database through a server. The information is isolated and presented to the users, who may modify the information. The modified information is compared with the isolated information and a set of changes is extracted from the comparison. Version information is generated and the changes are appended to the previous information in the database along with the version information so that the previous information in the database is not replaced by the changes. Hence, previous versions of the information are available for use. The users can also further modify the isolated information.

The present invention offers many advantages. A plurality of users may concurrently access and modify the information in the database. Information is isolated before modifications are made, and the changes are appended to the information in the database. No information is lost, and modifications made by a particular user can be isolated.

Modifications made to information are appended as different versions. Hence, previous versions of information are available. These can be used for rollback and decision management.

The problem of security is also addressed by the invention. Only users authorized to access information within the database are given access to it. If a user does not have authorization to access a part of the information, that part is not provided to the user. However, the rest of the information that the user queried for is provided to the user. Further, permissions are defined on the basis of relationships. This allows for flexibility of the system, as individual users need not be authenticated.

The invention may also be used for decision management within an enterprise. Information within a database may be analyzed and used for reporting, and numerical and statistical analyses.

BRIEF DESCRIPTION OF THE DRAWINGS

Various embodiments of the invention will hereinafter be described in conjunction with the appended drawings provided to illustrate and not to limit the invention, wherein like designations denote like elements, and in which:

FIG. 6 is an illustration showing the representation of isolated information in a spreadsheet;

DESCRIPTION OF VARIOUS EMBODIMENTS

Figure 1:
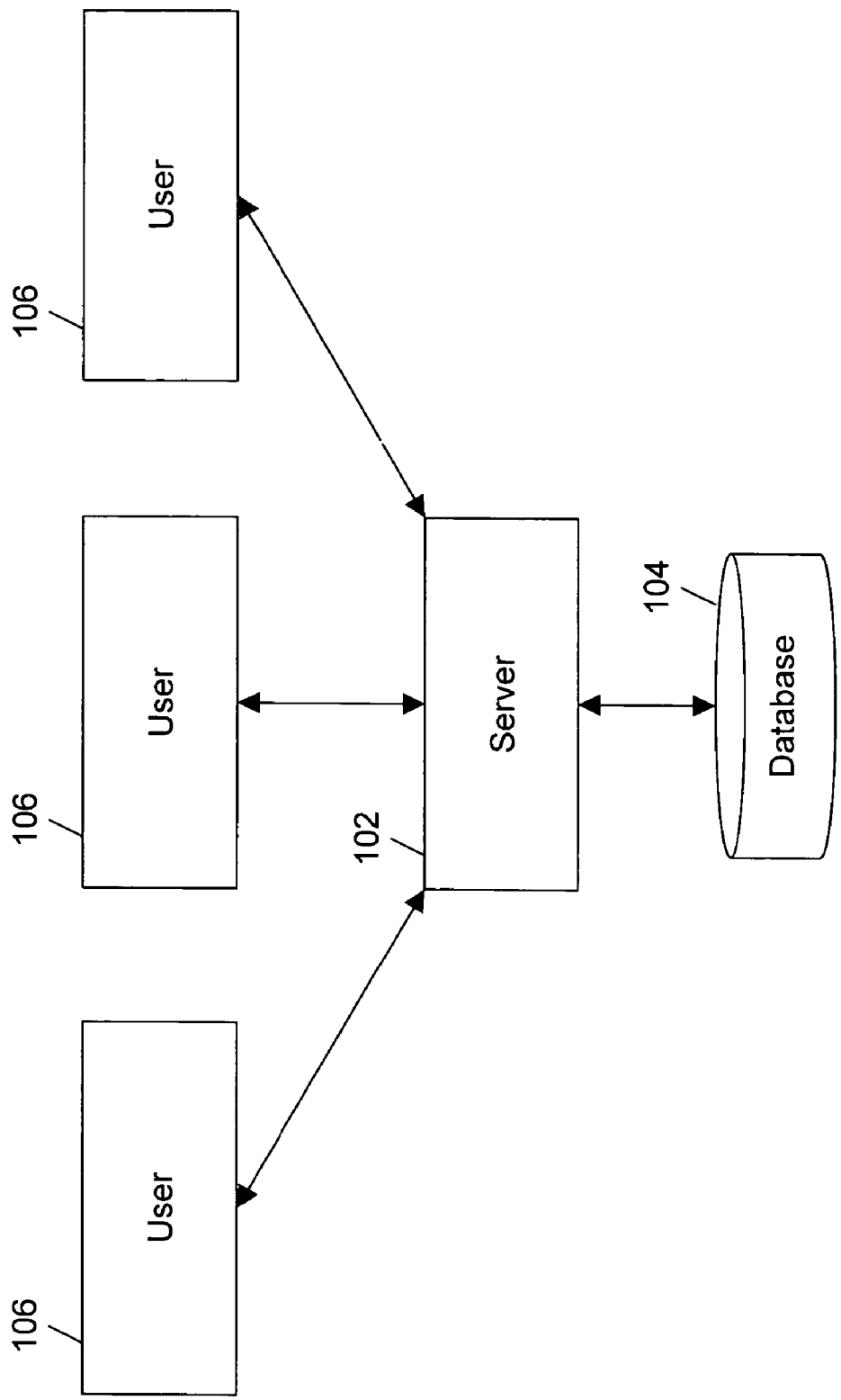
FIG. 1 is a block diagram illustrating the environment in which the present invention is implemented.

For the sake of convenience, the terms used to describe the various embodiments are defined below. It should be noted that these definitions are provided to merely aid the understanding of the description, and that they in no way limit the scope of the invention.

Information—Information is an ordered collection of data. For an enterprise, sales reports obtained from sales offices, budgets provided by various departments, requests for proposals sent by vendors and feedback from customers are a few examples of information.

Cuboid—A cuboid is representation of the way data is organized in an embodiment of the present invention. A cuboid comprises cells. In accordance with the present invention, information is stored in cells in a cuboid. The cuboid is stored in a database. The cuboid has rows and columns of cells. Further, each cell within a cuboid is versioned and may be addressed with the help of the row, the column and the version of the cell. For example, a cell L is addressed as L(r,c,v), where 'r' is the row in which the cell lies, 'c' is the column in which the cell lies, and 'v' is the version of the cell. Rows and columns can be added to and deleted from the cuboid.

Cell—A cell is a location where data values are stored within a cuboid. Exemplary types of data values include numbers, dates, characters and text. For example, an MS EXCEL™ sheet comprises a plurality of cells.

Version—Each cell in the cuboid is assigned a version. As data values in a cell are modified, the cell is assigned a different version. Further, as the new data values have a new version, the previous data values may also be accessed. A version may be a tag, a number or a function of time.

Element—An element comprises all the versions of a cell in the cuboid. An element is addressed as E(r,c) where r is the row and c is the column.

User—A user is any entity that accesses the cuboid. For example, the user could be a person or a computer. The user may access the cuboid to read cells or to modify the data values within cells. A plurality of users may access one cuboid concurrently.

Configuration—A configuration is a part of the information or a set of cells obtained from the cuboid. The configuration is represented as a two-dimensional table for illustration purposes. According to one embodiment of the present invention, a configuration may be viewed as an MS EXCEL™ spreadsheet. Only one version of any element exists within a configuration.

Meta-model—A meta-model describes the cuboid in terms of the number of rows and columns in it. A change in the meta-model leads to a corresponding change in the number of rows or columns in the cuboid. The meta-model also describes the sequence or the order of rows and columns in the cuboid.

The present disclosure relates to a method, a system and a computer program product for managing information within an enterprise. The information is stored in a database and can be concurrently accessed and updated by a plurality of users. Further, the information is versioned so that prior information is available to users.

FIG. 1 is a block diagram illustrating the environment in which the present invention is implemented. A server 102 is responsible for managing the information. The information is stored in a database 104. For example, the information can comprise expense reports of an employee of an organization. Server 102 is an enterprise server. For example, server 102 may be a J2EE server or .Net server. Exemplary databases that may be used for the invention include relational databases, distributed databases and object-oriented databases.

In one embodiment of the present invention, a relational database is used to store the information. A plurality of users can access database 104 through server 102. A plurality of users 106 can connect to server 102 through, for example, the Internet or a LAN. For example, as shown in FIG. 1, users 106 access the information in database 104 through server 102.

The information may comprise, for example, sales figures from the sales department of an enterprise. Sales representatives access database 104 from a plurality of geographic locations and make modifications or additions to the information stored in database 104. Here, each sales representative acts as user 106. A separate cuboid may be kept in database 104 for other information. For example, another cuboid may be used to store the budgets of departments within an enterprise. Hence, data is consolidated in a single location.

Figure 2:
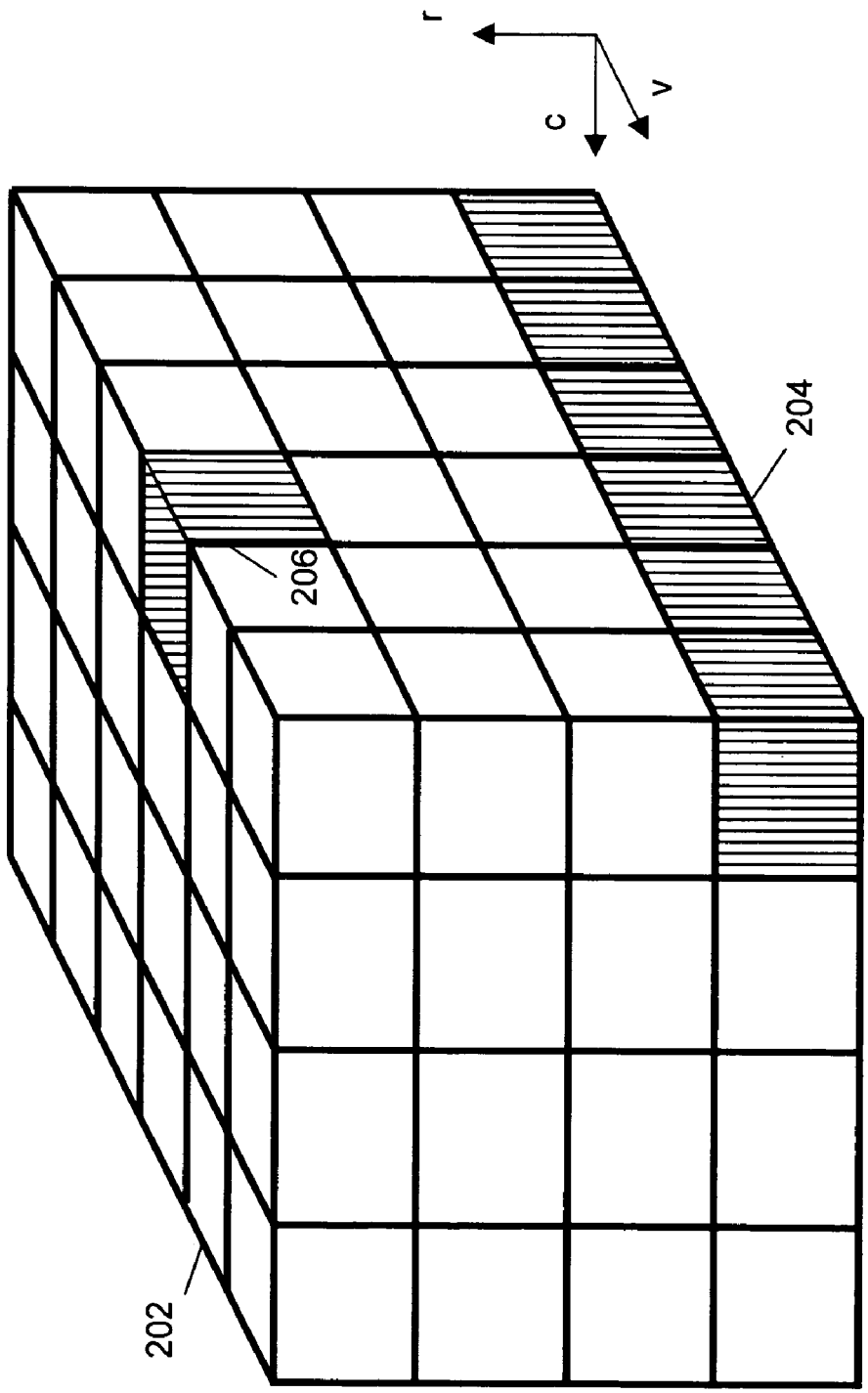
FIG. 2 is a block diagram illustrating a cuboid, which is a graphical representation of the data structure used in the present invention.

Information within database 104 is stored in the form of cells in "cuboids" which are a graphical representation of the data structure used in the present invention. FIG. 2 is a block diagram illustrating a cuboid. The dimensions of cuboid 202 represent rows 'r', columns 'c' and versions 'v'. Elements within cuboid 202 are addressed with the help of rows and columns. For example, an element 204 represented as E(4,4) represents the element that lies at the intersection of the fourth row and the fourth column of cuboid 202. Each cell within cuboid 202 is addressed with the help of its row, column and version. For example, a cell 206 represented as L(1,4,4) is the fourth version of the element that lies at the intersection of the first row and the fourth column of cuboid 202. Element 204 and cell 206 are shaded in FIG. 2. The number of rows and columns in a cuboid are defined by a meta-model.

Figure 3:
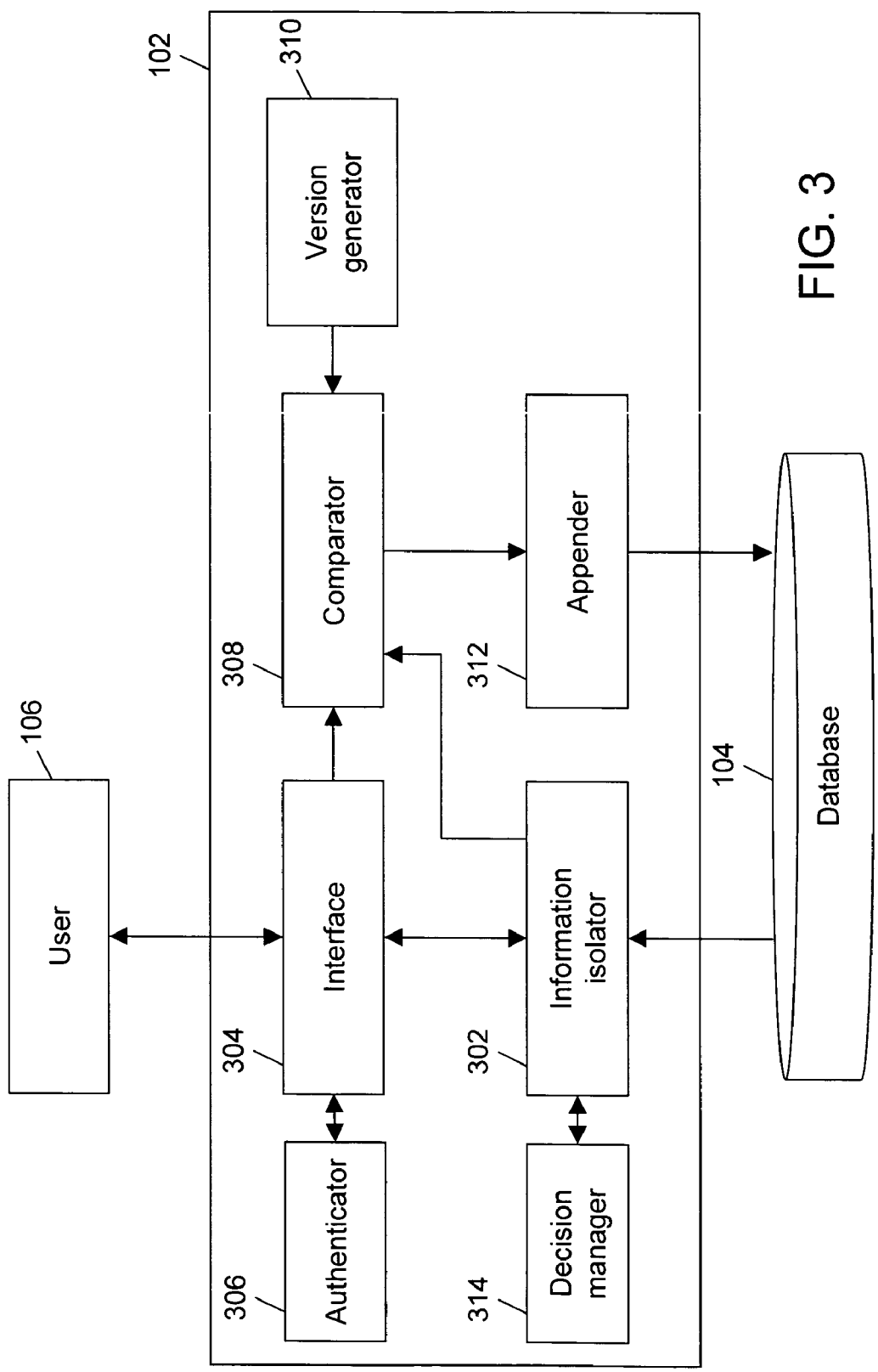
FIG. 3 is a block diagram illustrating the components of a server.

FIG. 3 is a block diagram illustrating the components of server 102. Server 102 comprises an information isolator 302, an interface 304, an authenticator 306, a comparator 308, a version generator 310, an appender 312, and a decision manager 314. User 106 queries database 104 for information with the help of interface 304. For example, user 106 may query for information using Structured Query Language (SQL). Authenticator 306 checks the authorization of user 106. In an embodiment of the invention, user 106 is authenticated on the basis of a password that user 106 provides to authenticator 306. On the basis of the query, information isolator 302 isolates a first part of information from database 104. This isolated information is presented to user 106 through interface 304. User 106 modifies the isolated information through interface 304 to form a second part of information. Comparator 308 compares the first part of information with the second part of information and extracts changes. Version generator 310 generates version information. Appender 312 appends the extracted changes along with the version information to the information stored in database 104. Decision manager 314 helps in decision management. The blocks of FIG. 3 are explained in detail below.

Figure 4:
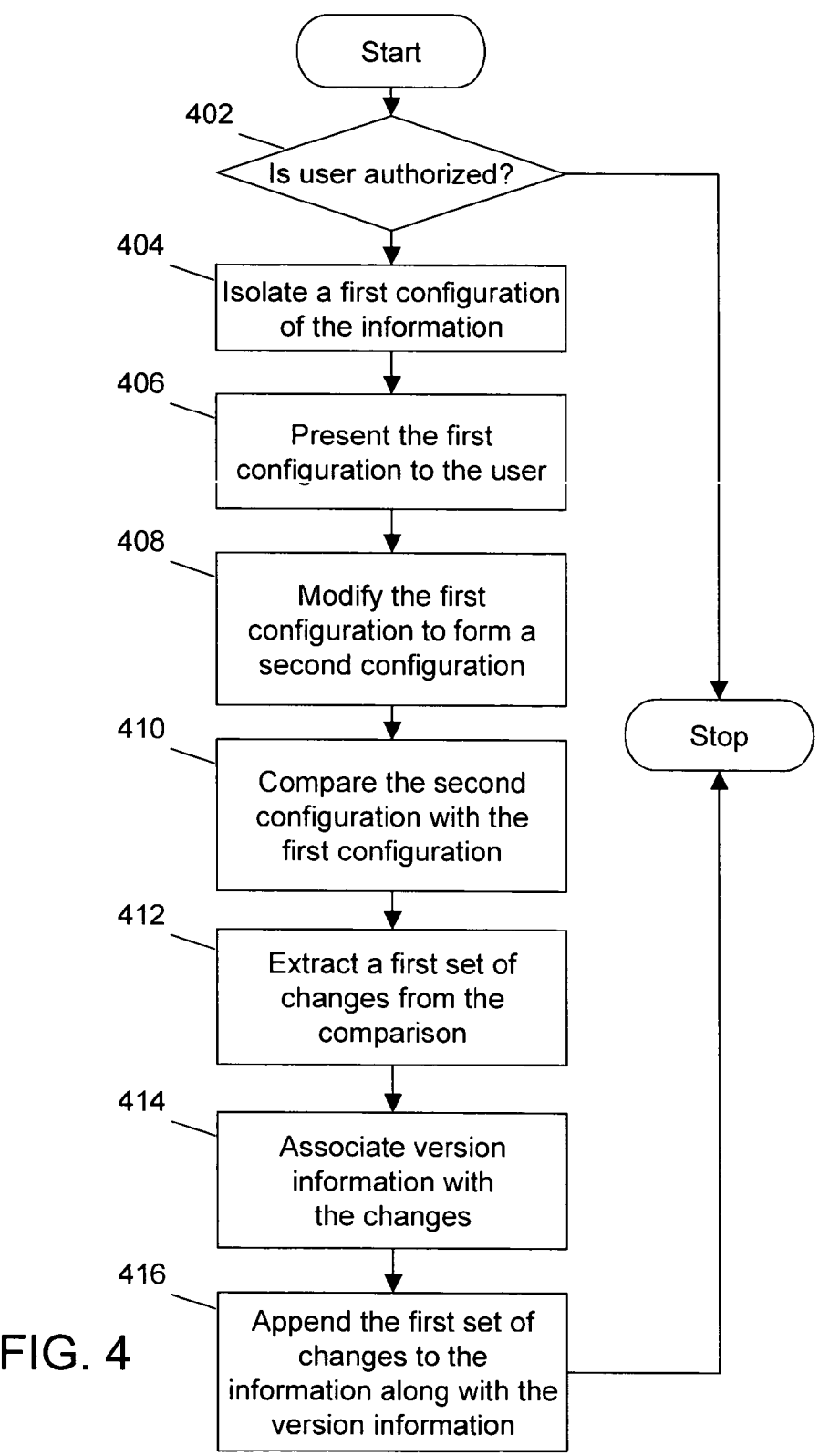
FIG. 4 is a flowchart showing the method of modifying the information in the database.

FIG. 4 is a flowchart showing the method of modifying the information in the database. At step 402, the authorization of user 106 is checked. In case the user is not authorized, user 106 is not allowed to access the information in cuboid 202. In accordance with an embodiment of the present invention, a configuration is isolated from cuboid 202 at step 404, based on the query of user 106. Step 404 is further explained later in conjunction with FIG. 5. This configuration is presented to user 106 at step 406. The configuration is modified at step 408 to form a second configuration. At step 410, the second configuration and the first configuration are compared. This comparison is used to extract changes at step 412. Steps 408, 410 and 412 are further explained later in conjunction with FIG. 7. Version information is generated at step 414. The extracted changes are appended to the information in database 104 along with the version information at step 416. Step 416 is described later in conjunction with FIG. 9. It would be apparent to those skilled in the art that the part of the information isolated at step 404 need not be in the form of a configuration. For example, information may be isolated in the form of a tree structure, without deviating from the scope of the invention.

Figure 5:
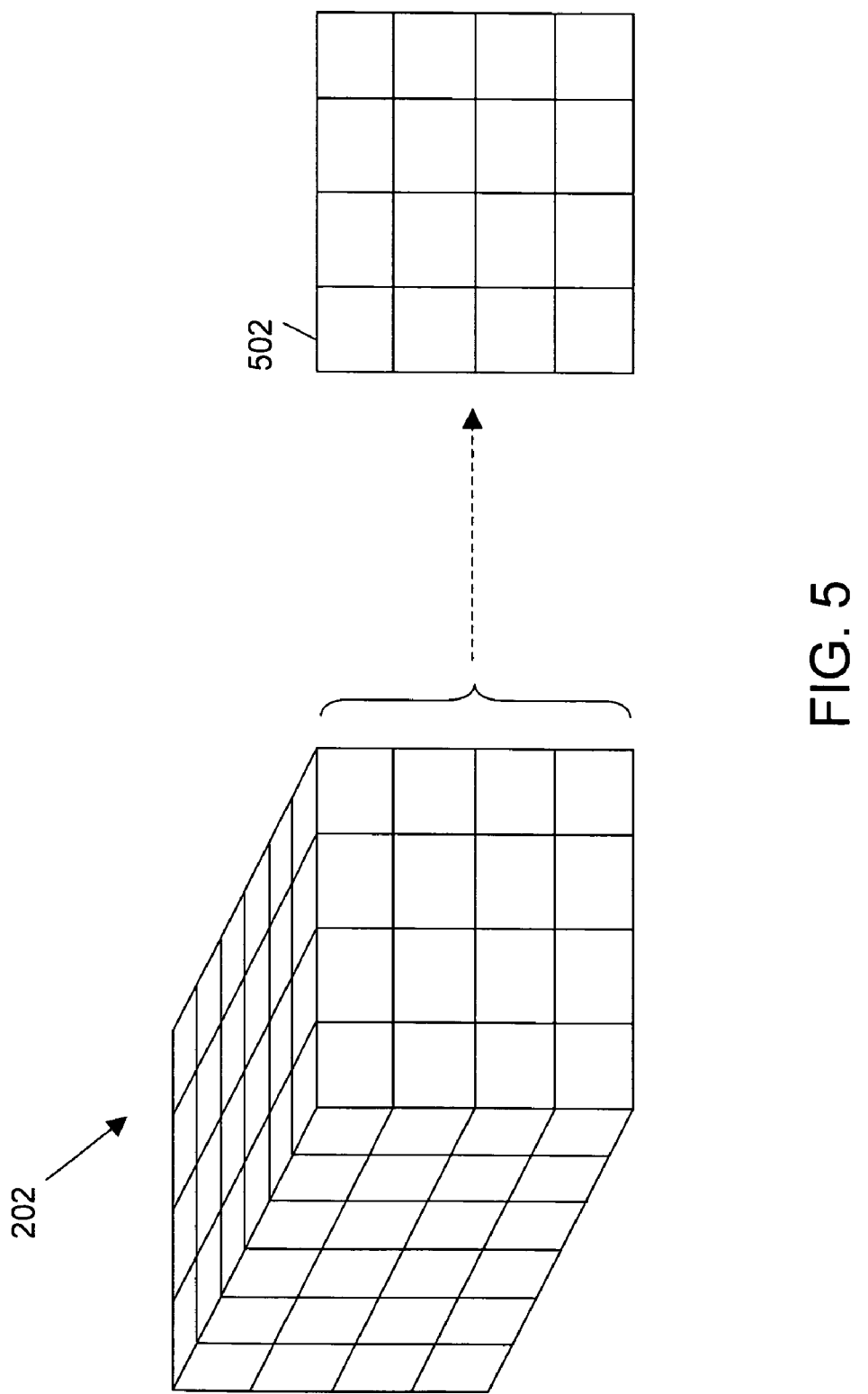
FIG. 5 is a block diagram illustrating the isolation of a part or configuration of the cuboid.

FIG. 5 is a block diagram illustrating the isolation of information from cuboid 202. A configuration 502 is isolated from cuboid 202 based on the query by user 106. The query defines the type of configuration 502 required by user 106. For example, the query could be in the form of 'latest cells for all the rows and columns'. In response to this query, configuration 502 would comprise the latest versions of all the cells. Another example of a query is 'latest cells belonging to user 106'. In this case, all the latest versions of cells belonging to user 106 form a part of configuration 502. As would be apparent to those skilled in the art, various other query forms may be used while querying database 104.

Authenticator 306 authorizes a user that accesses database 104 to access any information. For example, in case user 106 does not have permission to access a part of the information in cuboid 202, then this part of the information does not form a part of configuration 502. According to one embodiment of the invention, authenticator 306 authorizes users on the basis of relationships between the plurality of users 106. Examples of relationships include hierarchical relationships such as children, peers, parents, public and the like. For example, consider that the sales department of a manufacturing enterprise comprises a plurality of sales offices distributed across various geographic locations. Each of these sales offices may be considered as a child of the sales department. The sales department creates a cuboid for storing sales reports. The permissions for this cuboid are set so that children can access the cuboid. Then, all the sales offices may access the cuboid, as they are children of the sales department. The sales department in turn is considered as a parent to the sales offices. Each of the sales offices is considered as a peer to the other sales offices. Further, if a new sales office is added, then the new sales office is automatically given access to the cuboid as it is a child of the sales department. It will be apparent to those skilled in the art, that similar permissions can be defined for peers, parents and the like. In case the authorization is set to public, then any user can access the cuboid. Apart from the predefined hierarchical relationships, other relationships can also be defined. For example, a group of Vice-presidents from various sales offices may be given authorization to modify the cuboid that stores sales reports. Similarly, a hierarchy of management and employees within a department may be created and permissions to access a cuboid pertaining to that department may be given accordingly.

According to another embodiment of the invention, access permissions may be given to groups. For example, a group of vice presidents may be given access to a cuboid storing sales reports. Hence, only those users who belong to the group of vice presidents may access this cuboid. It will be apparent to those skilled in the art, that a combination of groups and hierarchical relationships may be used to define authorization.

In another embodiment of the present invention, authenticator 306 authorizes users on the basis of passwords provided by the users. The users provide passwords using interface 304. Authenticator 306 comprises a database of passwords assigned to the users. The passwords provided by the users are compared with passwords stored in the database and users are authorized only when the passwords match.

Further, the type of access may also be defined. For example, employees of the sales departments may be given read-only access to a cuboid, so that they may only view the information, but not append information to the cuboid. However, the vice presidents may be given read-write access, so that they may view and append information to the database.

Configuration 502 is presented to user 106 through interface 304. The presentation is in the form of a table that can be modified. Exemplary tools to present configuration 502 include a spreadsheet and a browser window. In one embodiment of the invention, configuration 502 is presented in a MICROSOFT EXCEL™ spreadsheet. FIG. 6 is an illustration showing the representation of isolated information in a MICROSOFT EXCEL™ spreadsheet. The isolated information comprises an expense report of an employee for a week. This expense report may be isolated from a database of expenses of employees of an enterprise. In this case, the cuboid representing this database includes expenses of every employee versioned by time. According to another embodiment of the invention, configuration 502 is presented in a MICROSOFT INTERNET EXPLORER™ browser window.

Figure 7:
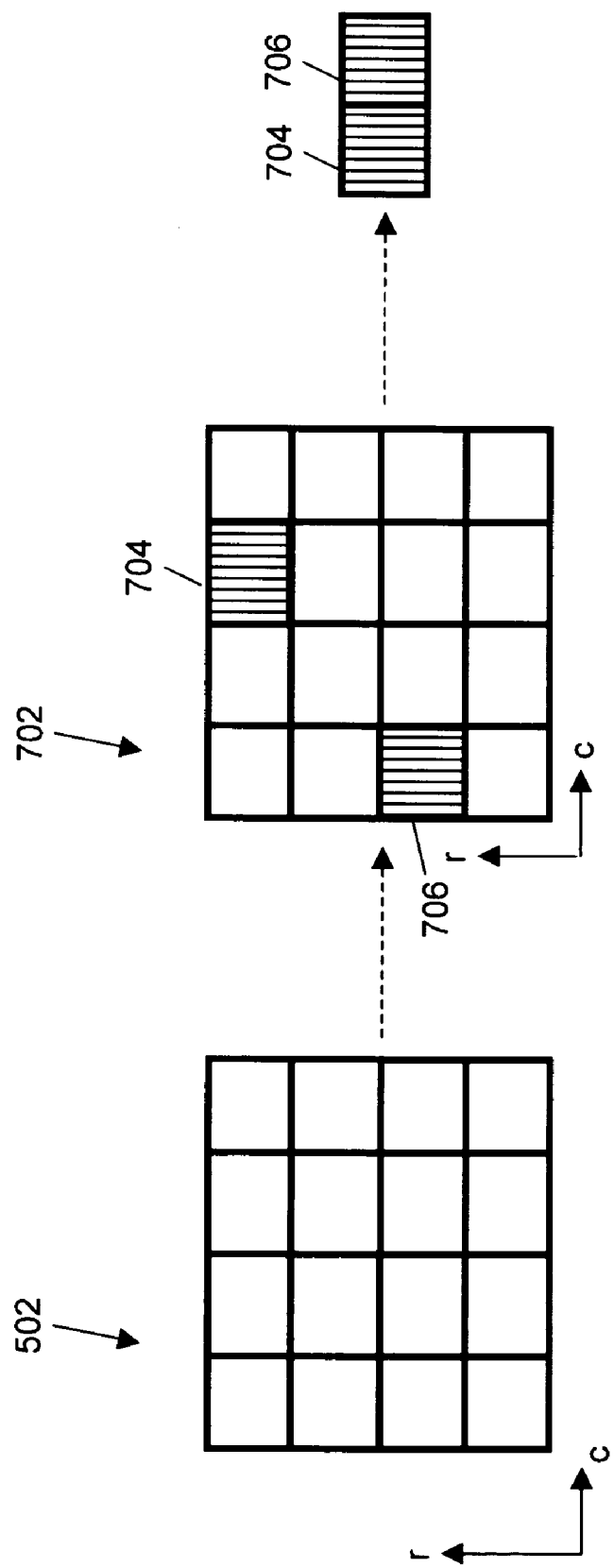
FIG. 7 is a block diagram illustrating the modification of the isolated part of the cuboid and the extraction of changes.

FIG. 7 is a block diagram illustrating the modification of configuration 502 and the extraction of changes. Modification of configuration 502 leads to the formation of configuration 702. Cell 704 and cell 706 have been modified within configuration 702. These cells are shaded and they can be represented as L(1,3) and L(3,1), respectively. Configuration 702 is compared with configuration 502 and the changes are extracted. For example, as shown in FIG. 7, the changes consist of changes in the values of data in cells 704 and 706.

Figure 8:
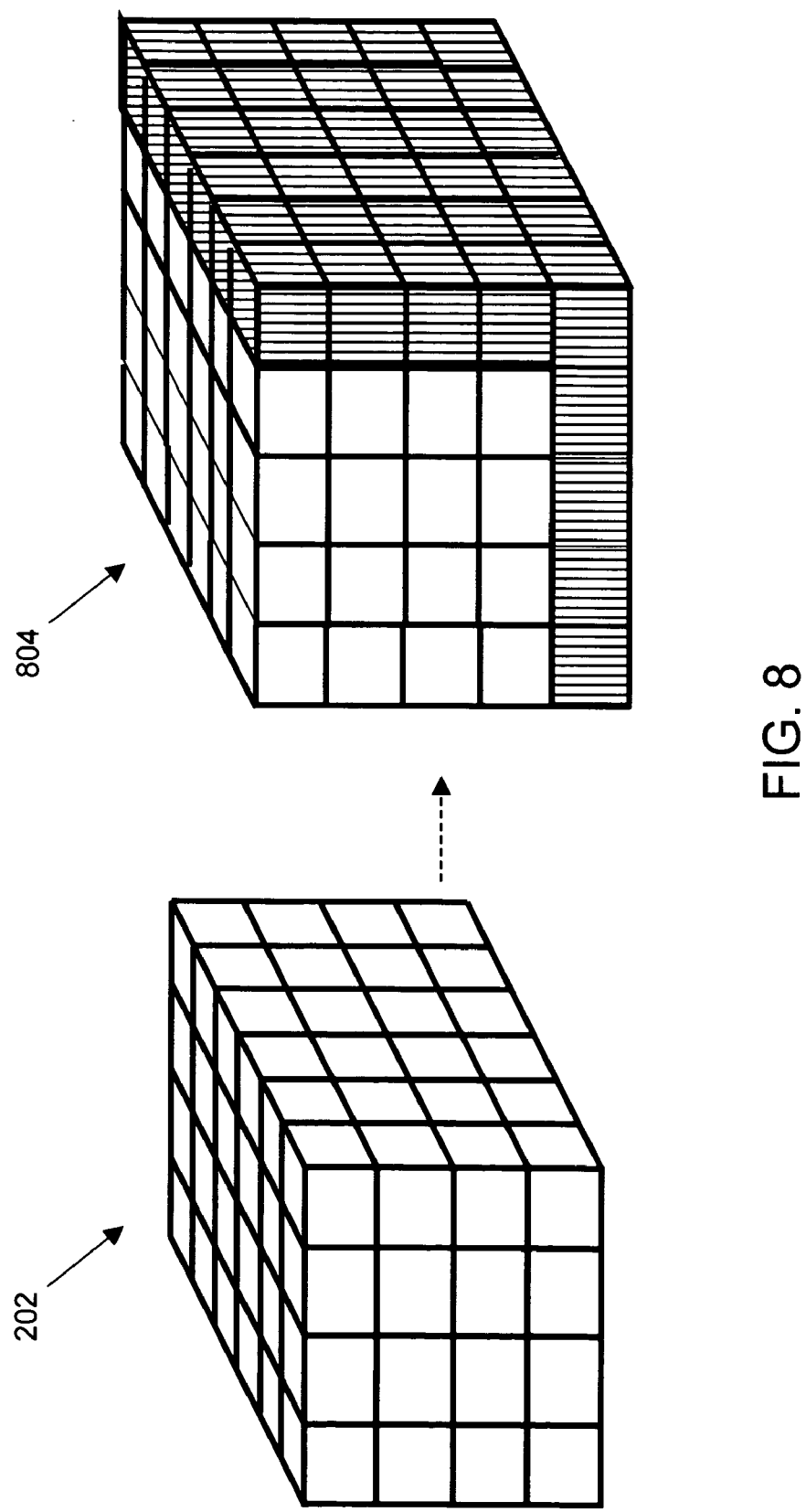
FIG. 8 is a block diagram illustrating the additions of a row and a column to the cuboid.

Changes that may be made to configuration 502 include changes in data values of cells; in the number of rows in configuration 502, i.e., additions or deletions of rows; and changes in the number of columns, i.e., additions or deletions of columns. FIG. 8 is a block diagram showing the addition of a row and a column to cuboid 202 to form a cuboid 804. The added row and column are shaded.

Version generator 310 generates version information for the changes that have been extracted. Version information is added so that the changes do not replace the data values within cuboid 202. Hence, previous versions may also be viewed. Version information may be in various forms. Exemplary forms of version information include a transaction number or a function of time. The version information is monotonic in nature. This means that the version should always increase to ensure that changes are always added. For example, if a monotonically increasing transaction number is provided to each user that accesses database 104, the transaction number may be used as the version information.

Figure 9:
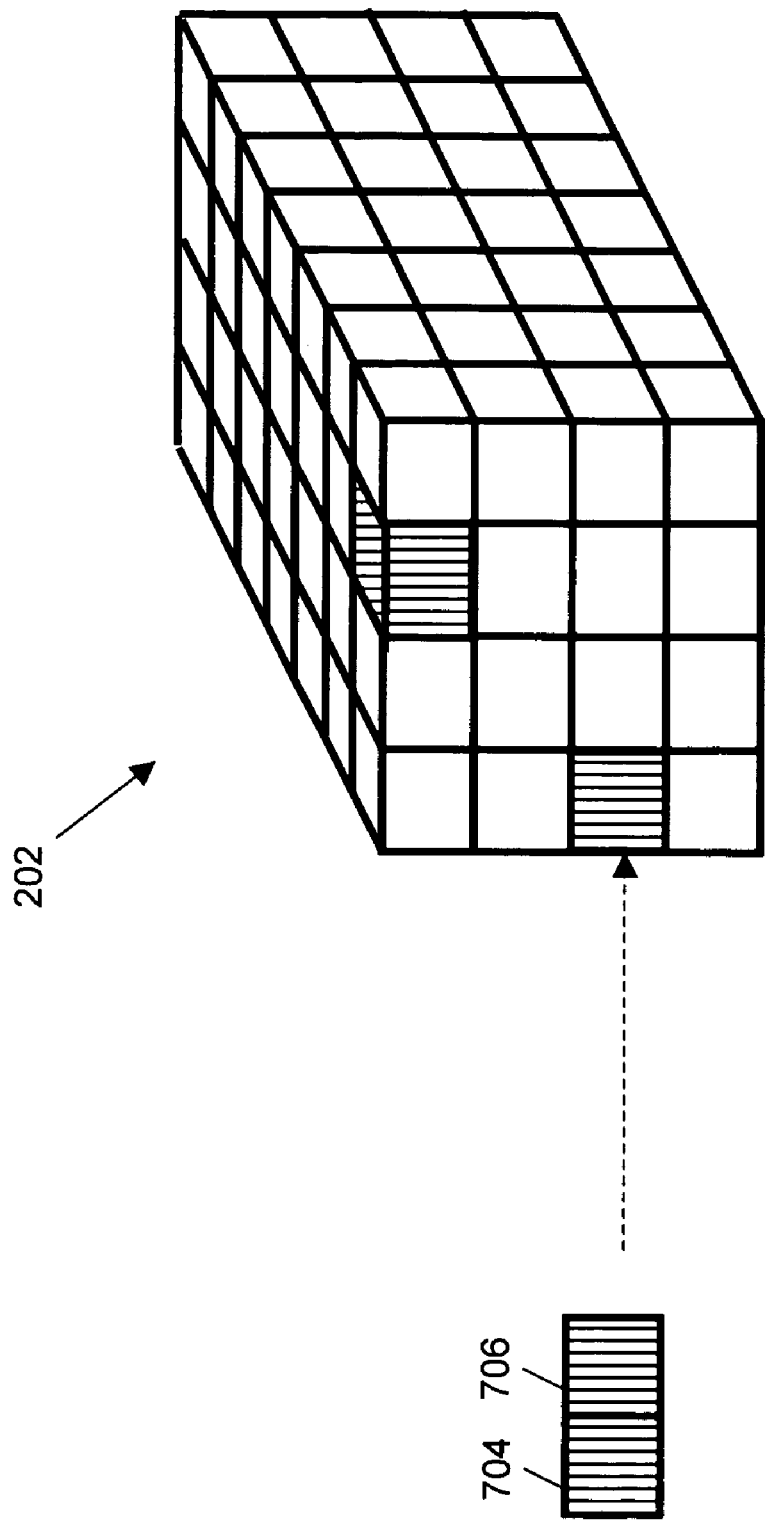
FIG. 9 is a block diagram illustrating the appending of the changes in the cuboid.

The changes extracted are appended to the information in cuboid 202 along with the version information by appender 312. FIG. 9 is a block diagram illustrating the appending of the changes to cuboid 202. The changes are added to cuboid 202 so that the cube grows in the version dimension. In one embodiment of the invention, blank cells are added to cuboid 202, so that cuboid 202 retains its cuboidal shape. It will be apparent to those skilled in the art that if the changes comprise a change in the number of rows or columns, then cuboid 202 will grow or shrink accordingly. For example, consider a case where expenses of employees of an enterprise are stored in a cuboid, with each row in the cuboid storing expenses for one employee. As and when new employees are added to the organization, the number of rows in the cuboid also has to increase. The number of rows in the cuboid is defined in the meta model. Hence, to increase the number of rows, a row counter in the meta model is increased. This is accomplished by changing the metamodel. In another embodiment, in case changes comprise deletion of the number of rows or columns in cuboid 202, then the rows or columns are not deleted but marked as inactive. This helps in the rollback of cuboid 202 to a previous state. Consider an example wherein the manager of the sales department of an enterprise may add a row corresponding to a new geographic region. This would lead to the addition of a new row in cuboid 202. Cells in the new row may be modified by a sales representative for the new geographical region. While information is appended to database 104, appender 312 locks database 104 for writing. Locking ensures that no other user can append changes to database 104 while changes from user 106 are being appended, thereby maintaining the consistency of data in database 104.

User 106 may make further changes in configuration 702. Therefore, user 106 does not have to make all the additions or modifications to isolated configuration 702 at one time. User 106 may make changes to configuration 702 as and when information is available. For example, user 106 may get sales figures from a plurality of sales representatives. These sales figures are added to a cuboid storing sales figures for all sales representatives. Then, user 106 does not need to isolate a configuration from the cuboid every time new sales figures are available. User 106 can isolate a configuration once and keep making changes to the isolated configuration. The changes made to the isolated configuration are also appended to the cuboid.

Figure 10:
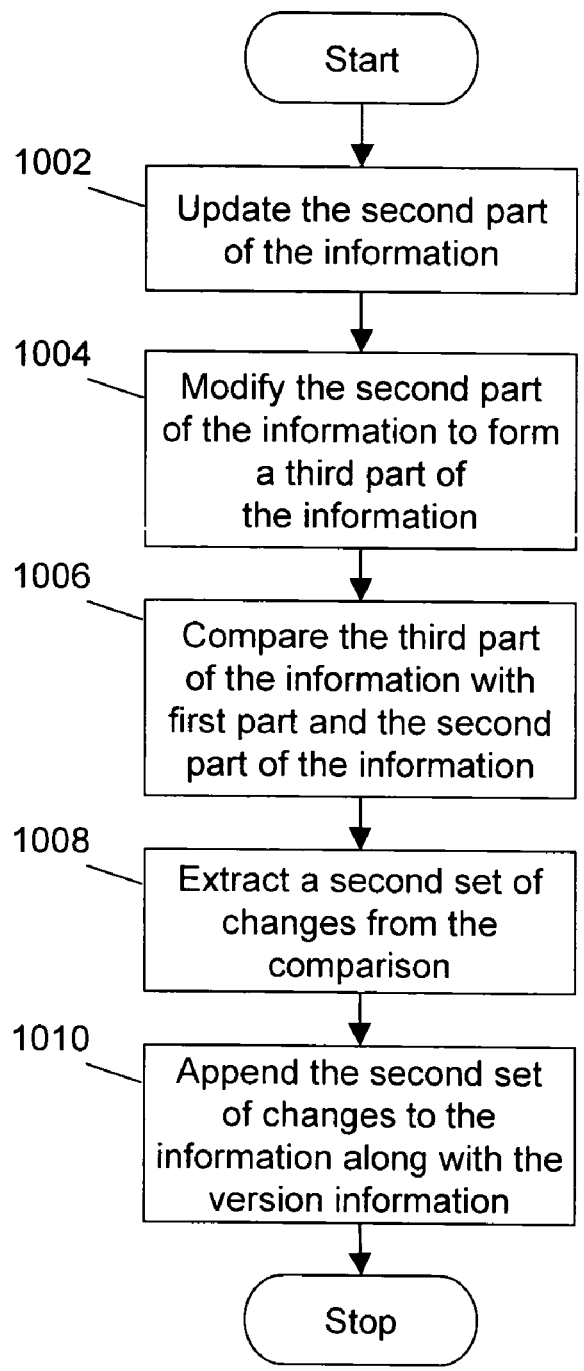
FIG. 10 is a flowchart showing the method of further modifying the isolated part of the cuboid.

FIG. 10 is a flowchart showing the method of further modifying configuration 702. Configuration 702 is updated from the information in cuboid 202 at step 1002. For example, if another user has increased the number of rows in cuboid 202, then a corresponding change is shown in configuration 702. This updated configuration is further modified at step 1004 to create a third part of the information, which is a configuration. The third part of information is compared with the first part of the information and the second part of the information in step 1006. A second set of changes is extracted from this comparison at step 1008. Steps 1004, 1006 and 1008 are further explained later in conjunction with FIG. 11. At step 1010, the changes extracted at step 1008 are appended to the information in database 104 along with the version information. Step 1010 is further explained later in conjunction with FIG. 12. For example, in case of a cuboid for employee expenses, a MICROSOFT EXCEL™ spreadsheet is isolated to represent the employee expenses. If a row is added to the cuboid to accommodate data corresponding to a new expense, the isolated spreadsheet is also modified accordingly. A new row may be added to the spreadsheet to create a second version of the spreadsheet. Further, if there's any change in the data corresponding to the new expense, the second version is modified to create a third version of the spreadsheet. If the three versions of the spreadsheet are compared, exact details of the new expense are obtained.

Figure 11:
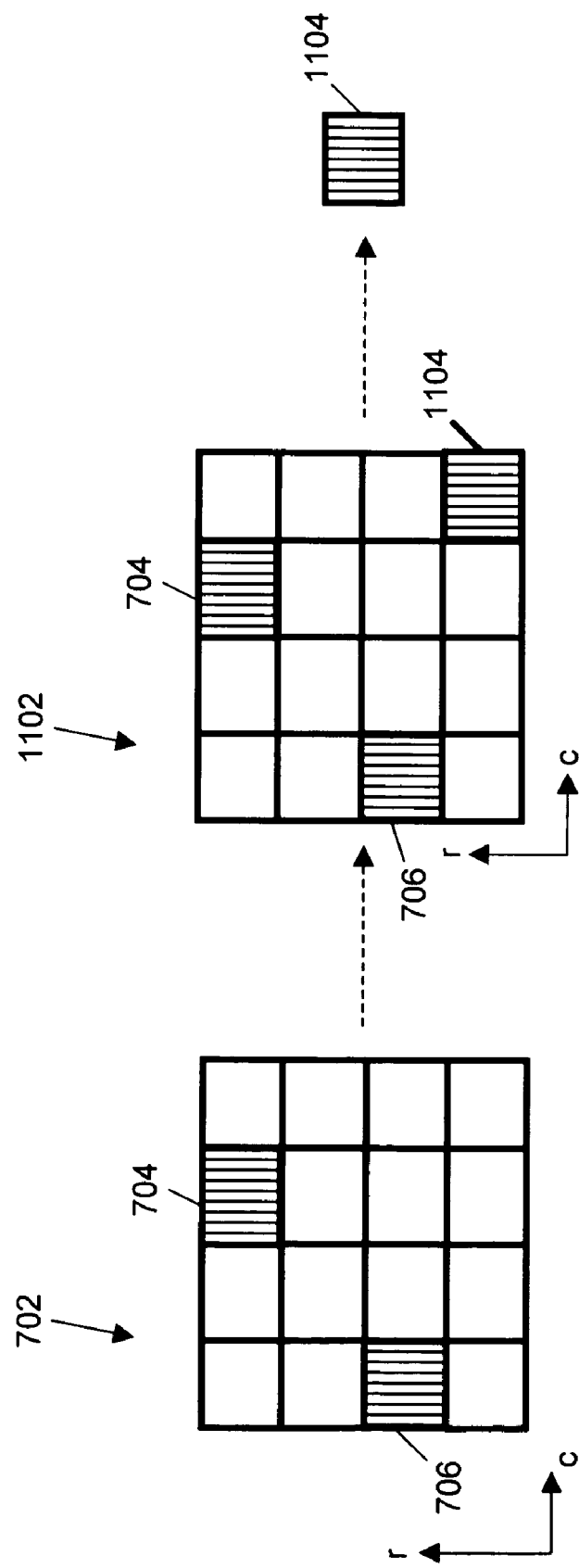
FIG. 11 is a block diagram illustrating the further modification of the isolated part of the cuboid and the extraction of a second set of changes.

FIG. 11 is a block diagram illustrating the further modification of the isolated part of the cuboid, i.e. configuration 702, and the extraction of a second set of changes. With the further modification of configuration 702, a new configuration 1102 is formed. Within configuration 1102, a cell 1104 has been modified. This cell is represented as as L(4,4). Configuration 1102 is compared with configuration 702, and configuration 502 and a second set of changes is extracted. As shown in FIG. 11, the only change that occurs is in cell 1104.

Figure 12:
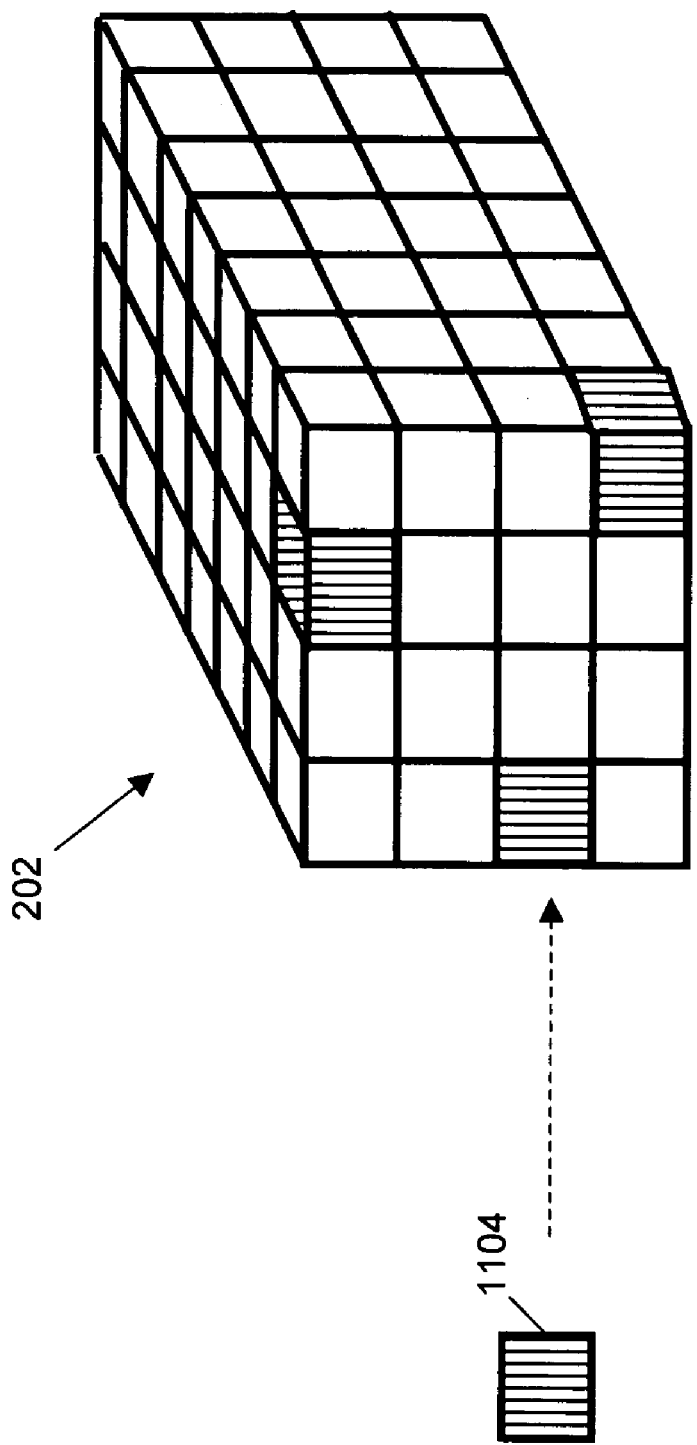
FIG. 12 is a block diagram illustrating the appending of the second set of changes into the cuboid.

FIG. 12 is a block diagram illustrating the appending of the second set of changes to cuboid 202. In one embodiment, the changes that are extracted are appended to the same version as the earlier set of changes. As shown in FIG. 12, cell 1104 is appended to the same version as cells 704 and 706. It will be apparent to a person skilled in the art that cell 1104 can be associated with new version information that is generated by version generator 310. The appending of cell 1104 will then cause cuboid 202 to grow in the version direction.

Figure 13:
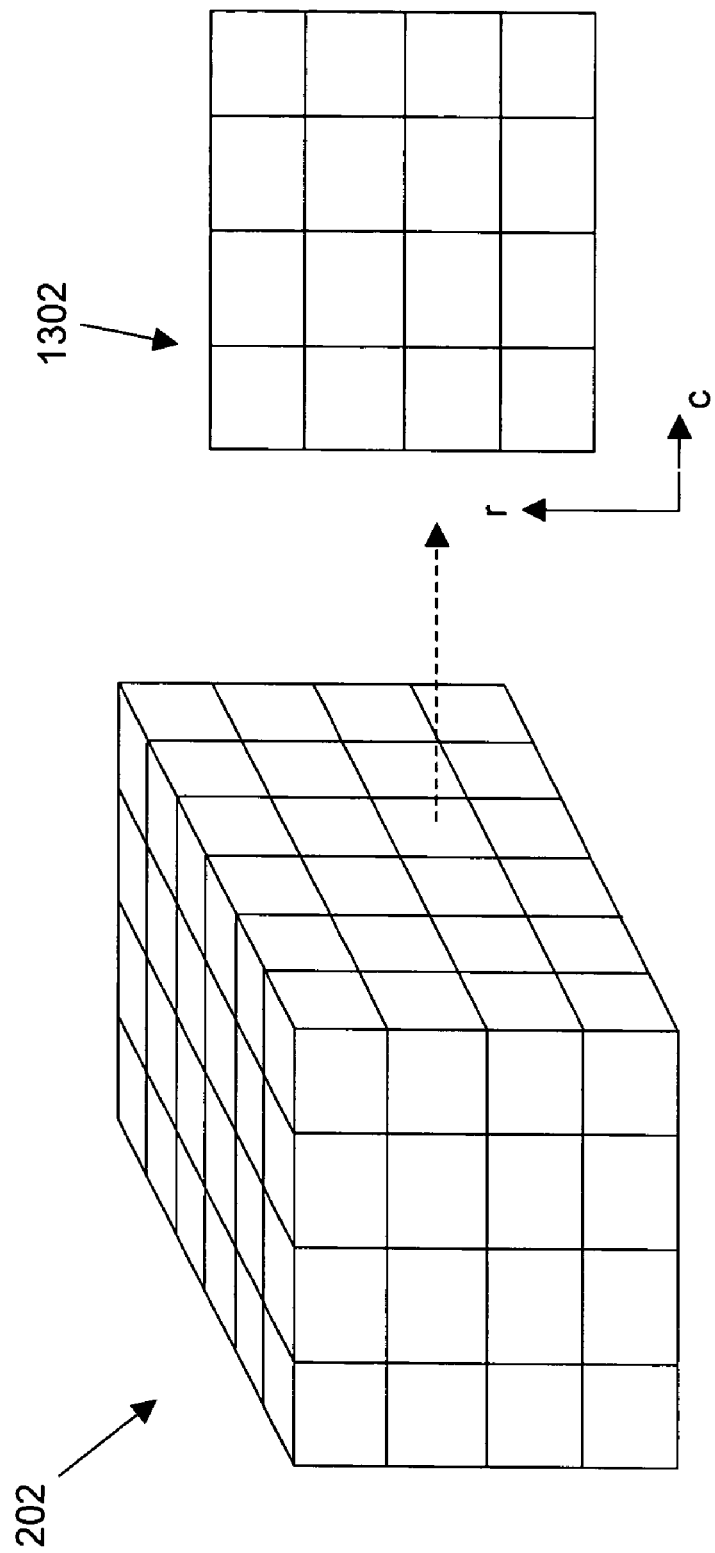
FIG. 13 is a block diagram illustrating the isolation of a previous version of information from the cuboid.

FIG. 13 is a block diagram illustrating the isolation of a previous version of the information in cuboid 202. Configuration 1302 comprises the cells of a prior version, and is created on the basis of a query from user 106. An exemplary query to obtain configuration 1302 is 'cells for all rows and columns as of two days ago'. Changes can be made to configuration 1302 in the manner described above. It should be apparent to those skilled in the art that user 106 may isolate a plurality of configurations 1302 and modify them concurrently.

As previous versions of the cells are stored in cuboid 202, a rollback of the information may also be performed. For example, if it is found that all the modifications made on a particular day are invalid, then user 106 may direct database 104 to 'rollback cuboid to yesterday'. All modifications that were made during the day are then deleted. In another embodiment, the data that is appended during the day is not deleted but marked inactive.

Figure 14:
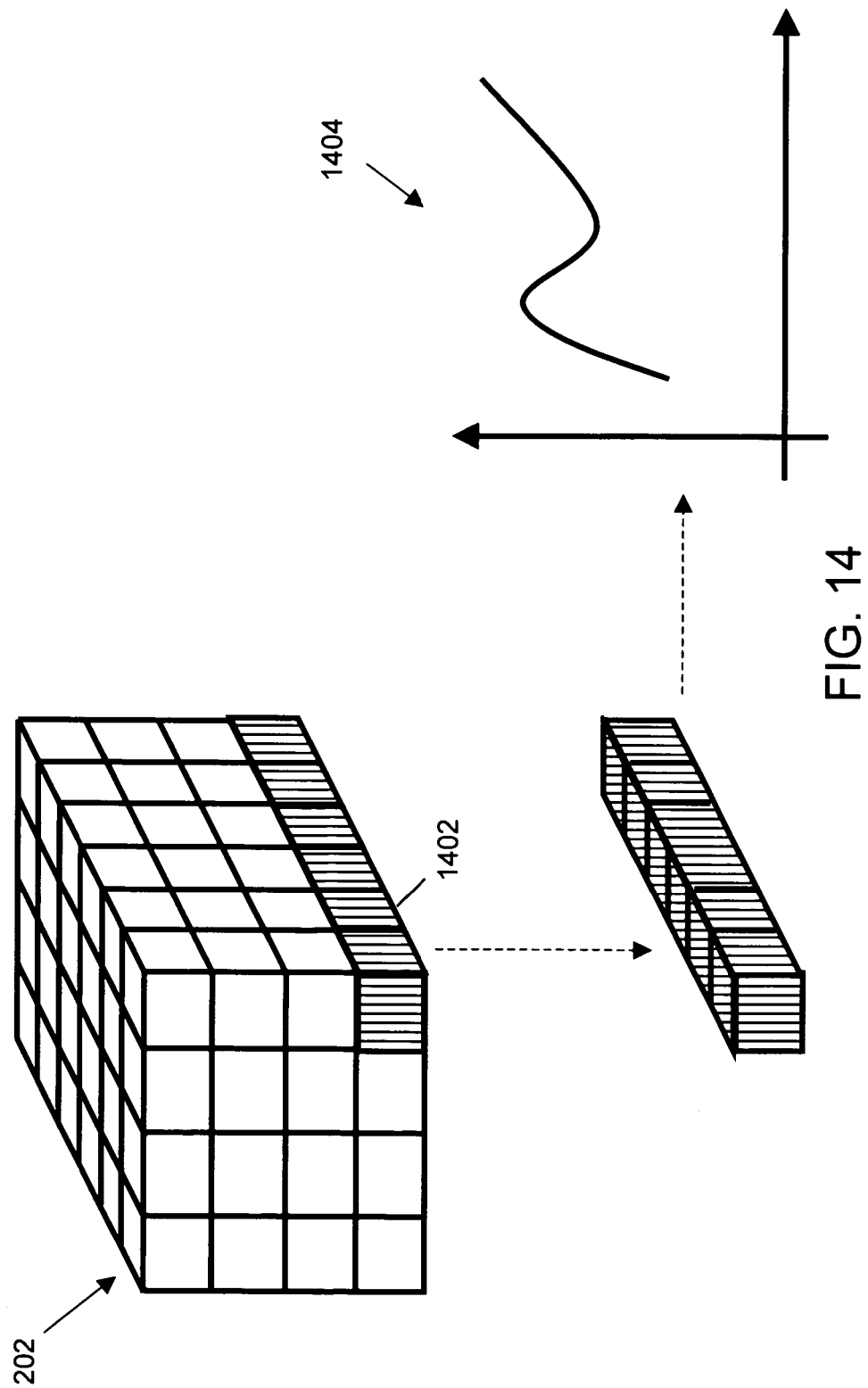
FIG. 14 is a block diagram illustrating the isolation of a part of the information from the table for decision management.

FIG. 14 is a block diagram illustrating the isolation of a part of the information from the cuboid for decision management. Decision manager 314 helps in managing decisions through reporting, and numerical and statistical analyses. For example, in FIG. 14, an element 1402 is extracted from cuboid 202. The values of all the cells in element 1402 are used to generate a graph 1404. Graph 1404 shows the trend of data values in the cells of element 1402. Graph 1404 may be used in a report. For example, the expense report shown in FIG. 6 can be used to generate a graph showing the trend of the employee's expenses across a week or according to the various types of expenses. As would be apparent to those skilled in the art, decision manager 314 may be used in a similar manner for numerical and statistical analyses.

Though the system of the present invention is described for a single cuboid, a plurality of cuboids may be used to manage information of an enterprise. For example, consider an enterprise, wherein each department creates separate cuboids for storing information such as budgets, sales reports, requests for proposals (RFP) and production volumes. An executive of the enterprise may consolidate information from each of the plurality of cuboids and use the information for decision management.

The cuboids can be functionally dependent or independent on each other. Two cuboids are functionally dependent if values of cells in one cuboid are functionally dependent on the values of cells of another cuboid. Similarly, two cuboids are functionally independent if the values of cells in one cuboid are functionally independent of values of cells in the other cuboid. For example, the values in a cuboid storing production volumes of an enterprise may be dependent on values in a cuboid storing RFP as production volumes are decided on the basis of RFP. However, a cuboid storing budgets of various departments of the enterprise is functionally independent of another cuboid storing sales reports as budgets and sales reports are not dependent on each other. The chief financial officer (CFO) of the enterprise can refer to information from these cuboids to generate a periodic financial report of the company.

Further, while working on multiple cuboids, user 106 can also create snapshots or baselines of the cuboids. A snapshot is a set of configurations from at least one cuboid. If user 106 wants to refer to this set of configurations, user 106 can refer to the snapshot instead of isolating the configurations by querying the database again. For example, user 106 can create a snapshot of configurations for a particular day and give it an appropriate name. Then to refer to the configurations at a later date, the user can recall the snapshot instead of querying the database to isolate the the configurations again.

The system as described above can be used for a variety of applications in an enterprise. Exemplary applications include sales force management, product planning, budget planning, demand planning, auditing, and project management. For example, in sales force automation, sales representatives can use a cuboid to store and retrieve sales reports. Information such as contact details of the customers may also be stored in the cuboid. The cuboid hence acts as a consolidated source of information, which ensures that no customer is contacted by more that one sales representative. Sales managers can access the consolidated information in the cuboids for reference and analysis. For example, productivity of a sales representative may be derived from the number of contacts that the sales representative is able to obtain an order from and the time spent by the sales representative in obtaining the order.

The system for managing information, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device, which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine. Further, the computer system executes an operating system. Exemplary operating systems with which the invention may be implemented include MICROSOFT WINDOWS™, UNIX™ and LINUX™.

The invention described above offers many advantages. A plurality of users may concurrently access and modify the information in the database. Information is isolated before modifications are made, and the changes are appended to the information in the database. No information is lost, and modifications made by a particular user can be isolated.

Modifications made to information are appended as different versions. Hence, previous versions of information are available. These can be used for rollback and decision management.

The structure of information in the cuboid is dynamic, i.e., the dimensions of a cuboid can be modified by increasing or decreasing the number of rows and columns.

The problem of security is also addressed by the invention. Only users authorized to access information within the database are given access to it. If a user does not have authorization to access a part of the information, that part is not provided to the user. However, the rest of the information that the user queried for is provided to the user. Further, permissions are defined on the basis of relationships. This allows for flexibility of the system, as individual users need not be authenticated.

Lastly, the invention may be used for decision management within an enterprise. Information within a database may be analyzed and used for reporting, and numerical and statistical analyses.

While the preferred embodiments of the invention have been illustrated and described with respect to management of information within an enterprise, it will be clear that the invention is not limited to these embodiments only. Numerous modifications, changes, variations, substitutions and equivalents will be apparent to those skilled in the art, without departing from the spirit and scope of the invention as described in the claims. The invention may be used wherever management of information is required.

What is claimed is:

1. A method for managing information, the information being organized in a database in a cuboid, wherein the cuboid comprises a plurality of cells for storing data values, and wherein each cell of the plurality of cells is versioned by a row, a column and a version information of the cell, the method comprising the steps of:
   a. checking the authorization of a plurality of users accessing the information based on the relationship of the plurality of users in a hierarchy;
   b. isolating a first part of the information, wherein the first part of information is isolated in form of a configuration by the plurality of users;
   c. modifying the first part of the information concurrently by the plurality of users to form a second part of the information, wherein each user of the plurality of users is capable of modifying the first part of information in isolation;
   d. comparing the second part of the information with the first part of the information, for extracting changes, wherein the changes comprise at least one change selected from a group comprising a change in the row, a change in the column, and a change in the data value of the cell;
   e. extracting a first set of data values from the comparison between the second part of information and the first part of the information;
   f. associating a time information, a row information, and a column information with each data value of the first set of data values; and
   g. appending the data values with the information in the database, wherein the appending causes the cuboid to grow in a version direction; and
   h. using the first part of the information and the second part of the information for decision management, wherein the decision management comprises analyzing one or more trends based on the first information and the second information.

2. The method of claim 1 further comprising the step of presenting the isolated part of the information to the plurality of users.

3. The method of claim 1 the row information of the data value, and the column information of the data value is presented in a spreadsheet representation.

4. The method of claim 1 wherein the data values comprise at least one data value selected from a new data value at the row, a new data value at the column, creation of a new row and creation of a new column.

5. The method of claim 1 further comprising the step of updating the second part of the information from the information in the database.

6. The method of claim 1 further comprising the steps of:
   a. modifying the second part of the information to form a third part of the information, wherein second part of the information is modified by the plurality of users;
   b. comparing the third part of the information with the second part of the information and the first part of the information;
   c. extracting a second set of data values from the comparison between the third part of the information, the second part of the information and the first part of the information; and
   d. appending the second set of data values to the information in the database along with the version information.

7. The method of claim 6 wherein the third part of the information is a spreadsheet representation.

8. A system for managing information, the information being organized in a database in a cuboid, wherein the cuboid comprises a plurality of cells for storing data values, and wherein each cell of the plurality of cells being versioned by a row, a column and a version information of the cell, the system comprising:
   a. a memory module, the memory module comprising a database for storing the information, wherein the information being accessed concurrently by a plurality of users; and
   b. a processing machine, the processing machine comprising:

an authenticator for checking authorization of the plurality of users on the basis of a hierarchical relationship between the plurality of users;

an information isolator for isolating first and second parts of the information, wherein the first part of information is isolated by the plurality of users authorized to access the first part of information;

a comparator for comparing first and second parts of the information to extract changes in the data values, wherein the changes comprise at least one change selected from a group comprising a change in the number of rows, a change in the number of columns, and a change in the data value of the cell;

a version generator for generating version information; and an appender for appending the data values to the information stored in the database along with the row information, the column information, and the time information; and a decision manager for using the first part of the information and the second part of the information for decision management, wherein the decision management comprising analyzing one or more trends based on the first part of the information and the second part of the information.

9. The system of claim 8 further comprising an interface for presenting parts of the information to a user.

10. The system of claim 8 wherein the data value comprise at least one data value selected from the group consisting of a new data value at the row, a new data value at the column, creation of a new row, and creation of a new column.

11. A computer program product for use with a computer, the computer program product comprising a computer usable medium having a computer readable code embodied therein for managing information, the information being organized in a database in a cuboid, wherein the cuboid comprises a plurality of cells for storing data values, and wherein each cell of the plurality of cells is versioned by a row, a column and a version information of the cell, the computer program product performing the steps of:

a. checking the authorization of a plurality of users accessing the information based on the relationship of the plurality of users in a hierarchy;

b. isolating a first part of the information, wherein the first part of information is isolated in form of a configuration by the plurality of users;

c. modifying the first part of the information concurrently by the plurality of users to form a second part of the information, wherein each user of the plurality of users is capable of modifying the first part of information in isolation;

d. comparing the second part of the information with the first part of the information, for extracting changes, wherein the changes comprise at least one change selected from a group comprising a change in the row, a change in the column, and a change in the data value of the cell;

e. extracting a first set of data values from the comparison between the second part of information and the first part of the information;

f. associating a time information, a row information, and a column information with each data value of the first set of data values; and g. appending the data values with the information in the database, wherein the appending causes the cuboid to grow in a version direction; and h. using the first part of the information and the second part of the information for decision management, wherein the decision management comprises analyzing one or more trends based on the first information and the second information.

12. The computer program product of claim 11 further performing the steps of:

a. modifying the second part of the information to form a third part of the information, wherein the second part of the information is modified by the plurality of users;

b. comparing the third part of the information with the second part of the information and the first part of the information;

c. extracting a second set of data values from the comparison between the third part of the information, the second part of the information and the first part of the information; and d. appending the second set of data values to the information in the database along with the row information, the column information, and the time information of the data values.

* * * * *